United States Patent
Kim (10) Patent No.: US 10,199,838 B2
(45) Date of Patent: Feb. 5, 2019

(54) BATTERY MODULE HAVING HOLDER

(71) Applicant: SAMSUNG SDI CO., LTD., Yongin-si, Gyeonggi-do (KR)

(72) Inventor: Suk-Kyum Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 117 days.

(21) Appl. No.: 15/225,702

(22) Filed: Aug. 1, 2016

(65) Prior Publication Data
US 2017/0054307 A1    Feb. 23, 2017

(30) Foreign Application Priority Data

Aug. 17, 2015  (KR) .................. 10-2015-0115556

(51) Int. Cl.
| | | |
|---|---|---|
| *H02J 7/00* | (2006.01) | |
| *H01M 10/44* | (2006.01) | |
| *H01M 2/20* | (2006.01) | |
| *H01M 2/12* | (2006.01) | |
| *H01M 10/613* | (2014.01) | |
| *H01M 10/6551* | (2014.01) | |
| *H01M 10/42* | (2006.01) | |
| *H01M 10/46* | (2006.01) | |
| *H01M 2/10* | (2006.01) | |

(52) U.S. Cl.
CPC ......... *H02J 7/0026* (2013.01); *H01M 2/1077* (2013.01); *H01M 2/1241* (2013.01); *H01M 2/202* (2013.01); *H01M 10/425* (2013.01); *H01M 10/441* (2013.01); *H01M 10/46* (2013.01); *H01M 10/613* (2015.04); *H01M 10/6551* (2015.04); *H02J 7/0044* (2013.01); *H01M 2010/4271* (2013.01); *H01M 2200/20* (2013.01)

(58) Field of Classification Search
CPC .. H01M 2/0212; H01M 2/024; H01M 2/1077; H01M 2/12; H01M 2/1241; H01M 10/613; H01M 10/6551; H01M 10/425; H01M 10/441; H01M 10/46; H01M 10/647; H02J 7/0026
USPC ....................................................... 320/112
See application file for complete search history.

(56) References Cited

U.S. PATENT DOCUMENTS

| | | | |
|---|---|---|---|
| 6,524,732 B1 * | 2/2003 | Iwaizono .............. | H01M 10/42 429/100 |
| 8,846,223 B2 * | 9/2014 | Park ...................... | H01M 2/105 429/154 |
| 9,246,200 B2 * | 1/2016 | Kang .................. | H01M 10/647 |

(Continued)

FOREIGN PATENT DOCUMENTS

| | | |
|---|---|---|
| KR | 10-2004-0031682 A | 4/2004 |
| KR | 10-2006-0037599 A | 5/2006 |
| KR | 10-0767912 B1 | 10/2007 |

*Primary Examiner* — M'Baye Diao
(74) *Attorney, Agent, or Firm* — Lewis Roca Rothgerber Christie LLP (57) ABSTRACT

An exemplary embodiment of the present invention provides a battery module including a plurality of rechargeable batteries, a holder defining a plurality of storage spaces for holding the rechargeable batteries in a stacked configuration, a housing for enclosing the holder, and including a first cover and a second cover that face each other and press the holder, and a protective circuit module in the housing and configured to control charging and discharging operations of the rechargeable batteries.

15 Claims, 6 Drawing Sheets

(56) References Cited

U.S. PATENT DOCUMENTS

| | | | |
|---|---|---|---|
| 9,543,551 B2* | 1/2017 | Tanaka | H01M 2/024 |
| 9,673,489 B2* | 6/2017 | Lee | H01M 2/0267 |
| 9,806,308 B2* | 10/2017 | Watanabe | H01M 2/12 |
| 2004/0070366 A1 | 4/2004 | Takeshita et al. | |
| 2006/0093899 A1 | 5/2006 | Jeon et al. | |
| 2006/0275658 A1 | 12/2006 | Sanada et al. | |
| 2010/0092859 A1* | 4/2010 | Kim | H01M 2/0404 |
| | | | 429/178 |
| 2012/0208047 A1* | 8/2012 | Park | H01M 2/0212 |
| | | | 429/7 |
| 2017/0025719 A1* | 1/2017 | Yamada | H01M 2/1077 |

* cited by examiner

BATTERY MODULE HAVING HOLDER

CROSS-REFERENCE TO RELATED APPLICATION

This application claims priority to, and the benefit of, Korean Patent Application No. 10-2015-0115556 filed in the Korean Intellectual Property Office on Aug. 17, 2015, the entire contents of which are incorporated herein by reference.

BACKGROUND

1. Field

Embodiment of the present invention relate to a battery module, and more particularly, to a battery module having a holder.

2. Description of the Related Art

A rechargeable battery differs from a primary battery in that it can be repeatedly charged and discharged, while the latter is incapable of being recharged. Low-capacity rechargeable batteries are used in small portable electronic devices, such as mobile phones, notebook computers, and camcorders, while high-capacity rechargeable batteries are widely used as a power source for driving a motor of an electric or hybrid vehicle.

A large capacity battery module consists of a plurality of rechargeable batteries, and the rechargeable batteries are connected in series or in parallel via a bus bar. The rechargeable batteries are fixed by an end plate, and are inserted into a housing along with a protective circuit module. When a structure for fixing rechargeable batteries is complicated, assembly efficiency of the battery module is reduced. In addition, the protective circuit module should be stably fixed inside the housing, and heat generated in the protective circuit module should be rapidly discharged.

The above information disclosed in this Background section is only to enhance the understanding of the background of embodiment of the invention, and therefore it may contain information that does not form the prior art that is already known in this country to a person of ordinary skill in the art.

SUMMARY

Embodiments of the present invention provide a battery module that can stably support rechargeable batteries, and a protective circuit module.

A battery module according to an exemplary embodiment of the present invention includes a plurality of rechargeable batteries, a holder defining a plurality of storage spaces for holding the rechargeable batteries in a stacked configuration, a housing for enclosing the holder, and including a first cover and a second cover that face each other and press the holder, and a protective circuit module in the housing and configured to control charging and discharging operations of the rechargeable batteries.

The battery module may further include a protection wall and a converter, and the housing may define a battery region into which the holder is inserted, and a circuit region into which the protective circuit module and the converter are inserted, and the battery region and the circuit region may be partitioned by the protection wall.

An upper end of the protection wall may be separated from a top surface of the second cover.

The holder may be cuboid shaped, and may include a plurality of barriers for defining the storage spaces.

The battery module may further include two support bars fixed at a side of the holder, and extending in a stacking direction of the rechargeable batteries, the support bars respectively defining terminal holes for respectively accommodating terminals of the rechargeable batteries.

The battery module may further include a bus bar for electrically coupling the terminals, and one of the support bars may include support protrusions for contacting lateral sides of the bus bar to support the bus bar.

The battery module may further include a first buffer plate having elasticity between the first cover and the protective circuit module.

The battery module may further include a first support protruding from the first cover to contact the first buffer plate.

The battery module may further include a second buffer plate having elasticity between the second cover and the converter.

The battery module may further include a second support protruding from the second cover to contact the second buffer plate.

The first buffer plate and the second buffer plate may include a thermally conductive polymer or a thermally conductive silicon.

The battery module may further include a first support protruding from the first cover, and a first thermally conductive plate between the protective circuit module and the first support.

The battery module may further include an upper thermal grease layer between the first thermally conductive plate and the first support.

The battery module may further include a second support protruding from the second cover to support a bottom surface of the converter, and a second thermally conductive plate between the converter and the second support.

The battery module may further include a lower thermal grease layer between the second thermally conductive plate and the second support.

The first thermally conductive plate and the second thermally conductive plate may include an elastic polymer plated with a thin metal layer.

According to embodiments of the present invention, the rechargeable batteries and the protective circuit module can be stably supported using the holder and the housing.

DETAILED DESCRIPTION

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
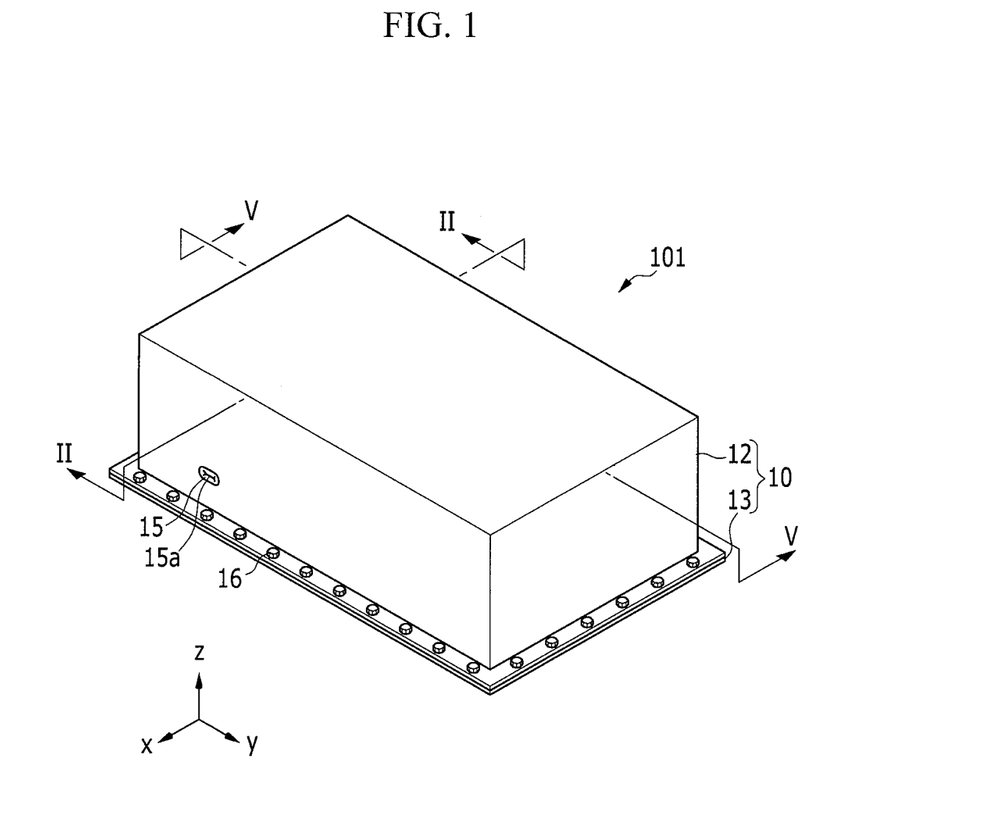
FIG. 1 is a perspective view of a battery module according to a first exemplary embodiment of the present invention.
Figure 2:
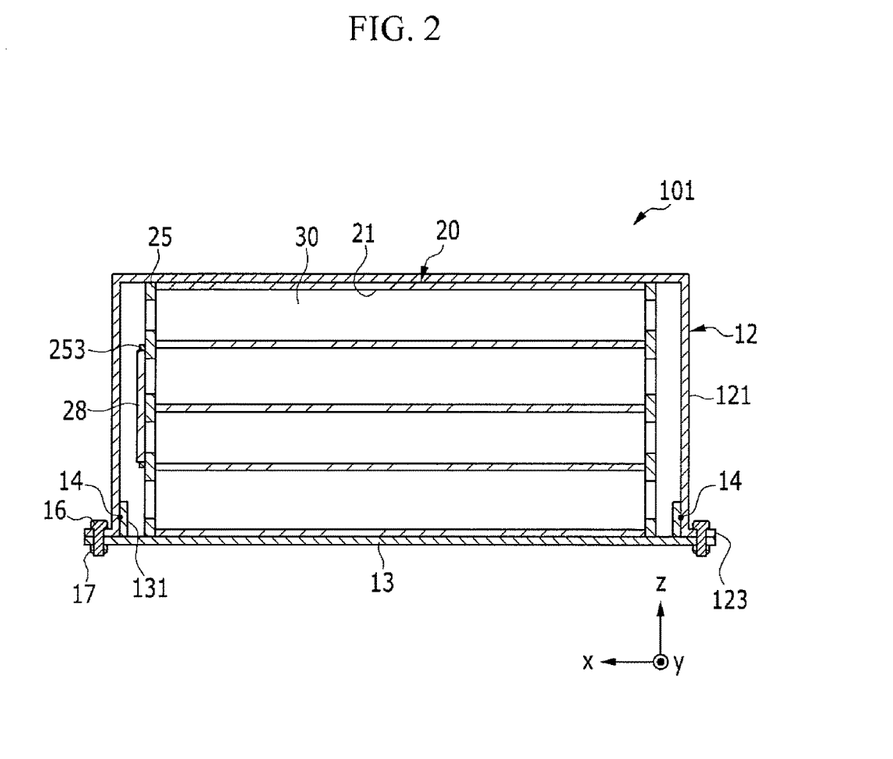
FIG. 2 is a cross-sectional view of the battery module of FIG. 1 taken along the line II-II.

FIG. 1 is a perspective view of a battery module according to a first exemplary embodiment of the present invention, and FIG. 2 is a cross-sectional view of the battery module of FIG. 1 taken along the line II-II.

Figure 5:
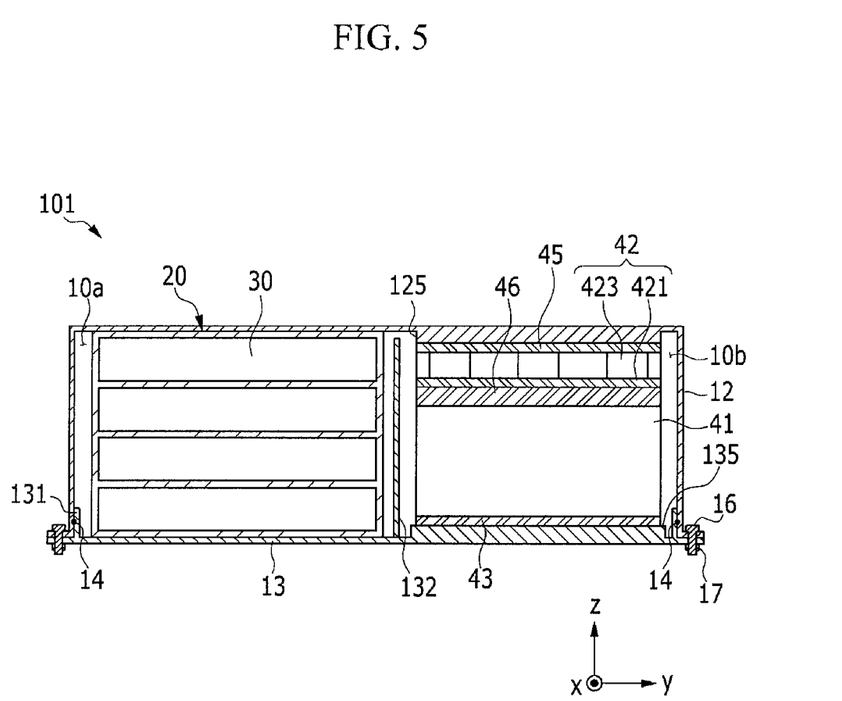
FIG. 5 is a longitudinal cross-sectional view of the battery module of FIG. 1 taken along the line V-V.

Referring to FIGS. 1 and 2, the battery module 101 according to the current first exemplary embodiment includes a plurality of rechargeable batteries 30, a holder 20, a housing 10, a protective circuit module 42 (see FIG. 5), and a converter 41 (see FIG. 5).

The rechargeable batteries 30 of embodiments of the present invention may substantially have a prismatic shape, and the rechargeable batteries 30 according to the current exemplary embodiment each have a quadrangular pillar shape. The rechargeable battery 30 performs charging and discharging operations, and may be a lithium-ion battery or a lithium polymer battery. A positive electrode terminal 31 and a negative electrode terminal 32 (see FIG. 3) are formed to protrude outside of each of the rechargeable batteries 30.

The housing 10 encloses the holder 20, and includes an upper first cover 12 and a lower second cover 13. The first cover 12 includes a receiving unit 121 that is concavely depressed to define an internal space, and a flange portion 123 that outwardly extends from a lower end of the receiving unit 121. The receiving unit 121 is formed to have a rectangular cross-section, and accommodates the rechargeable batteries 30, the protective circuit module 42, and the converter 41 therein.

A vent member 15 that is configured to be ruptured at a predetermined pressure is provided in the receiving unit 121, and a notch 15a is formed in the vent member 15 (e.g., the vent member 15 is scored to be configured to rupture). The flange portion 123 of the first cover 12 is fixed to the second cover 13 by a bolt 16 and a nut 17 while contacting the second cover 13.

Figure 3:
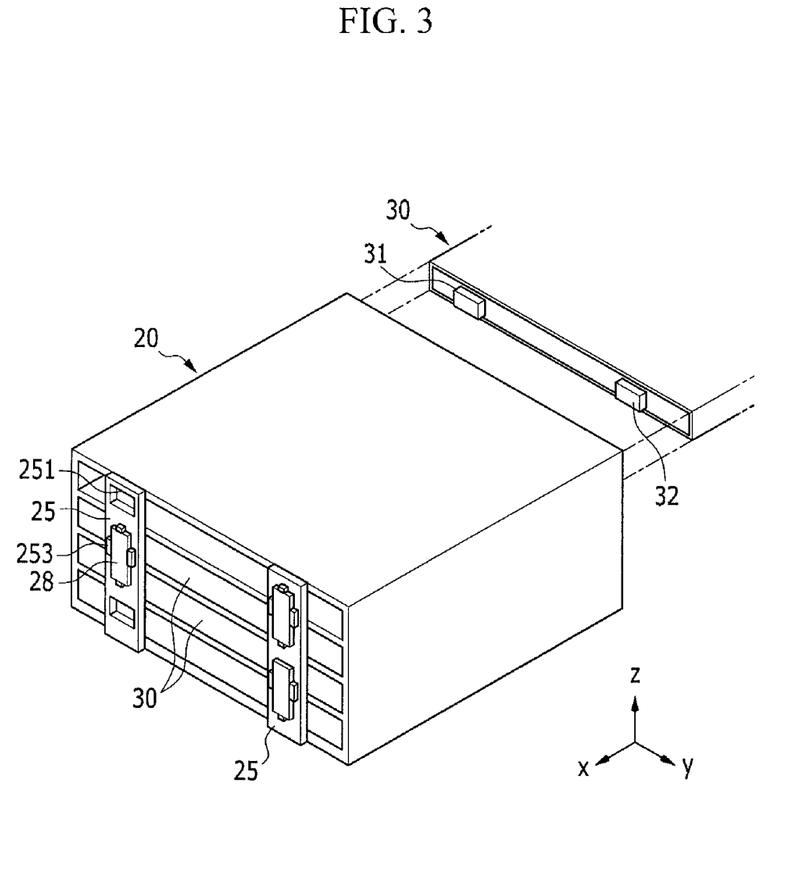
FIG. 3 is a partially exploded perspective view of a holder and rechargeable batteries according to the first exemplary embodiment of the present invention.
Figure 4:
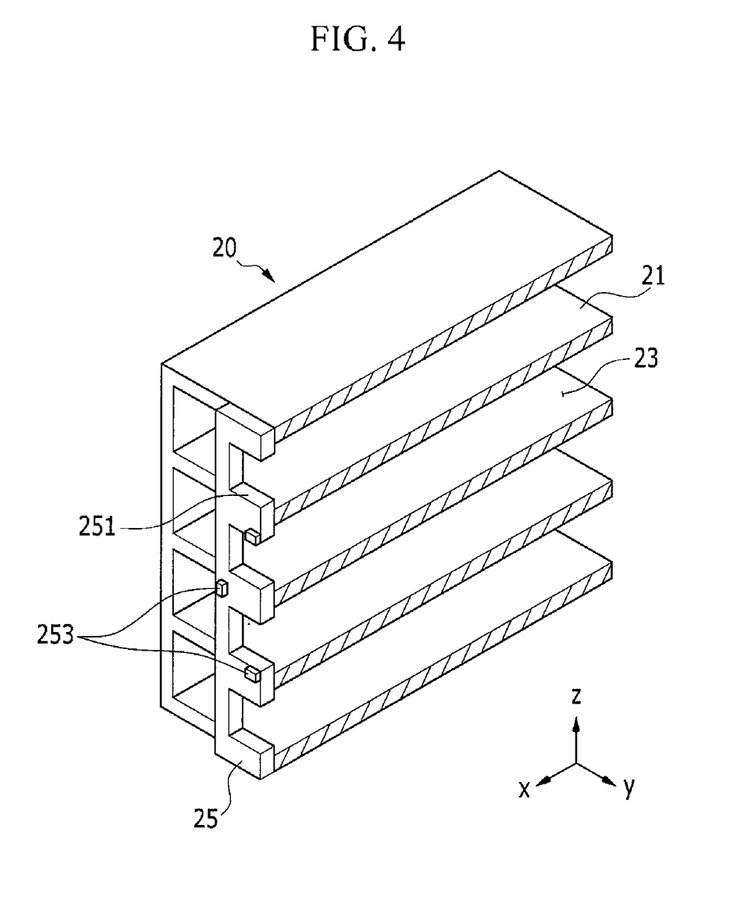
FIG. 4 is a cut-away perspective view of the holder according to the first exemplary embodiment of the present invention.

FIG. 3 is a partially exploded perspective view of the holder and the rechargeable batteries according to the first exemplary embodiment of the present invention, and FIG. 4 is a cut-away perspective view of the holder according to the first exemplary embodiment of the present invention.

Referring to FIGS. 3 and 4, a plurality of storage spaces 23 into which the rechargeable batteries 30 are inserted are formed in the holder 20, and the storage spaces 23 are partitioned by barriers 21 (e.g., barriers 21 of the holder 20). The barriers 21 are interposed between the rechargeable batteries 30, and the barriers 21 contact and support the rechargeable batteries 30.

Each storage space 23 has a structure with open opposite ends, and has a rectangular cross-section. The storage spaces 23 are arranged in parallel. The holder 20 has a cuboid shape, and the rechargeable batteries 30 are stacked and arranged by the holder 20.

Two support bars 25 are provided at one side of the holder 20, and the support bars 25 are formed in a direction along which the rechargeable batteries 30 are stacked (e.g., a stacking direction of the batteries 30, or the z-axis direction in FIG. 3). The support bar 25 is fixed to one or more of the barriers 21. Terminal holes 251 for accommodating the terminals 31 and 32 of a corresponding battery 30, into which the positive electrode terminal 31 or the negative terminal 32 of a corresponding battery 30 may be inserted, are formed in, or defined by the support bar 25.

The positive electrode terminal 31 and the negative electrode terminal 32 of each rechargeable battery 30 are inserted into a respective terminal hole 251, and are electrically coupled to the neighboring rechargeable batteries 30 via a respective bus bar 28. The bus bar 28 is formed in a plate shape, which extends in one direction (e.g., the z-axis direction in FIG. 3). The bus bar 28 may be welded to the positive electrode terminal 31 of a rechargeable battery 30 and to the negative electrode terminals 32 of an adjacent neighboring rechargeable battery 30 to connect the two rechargeable batteries 30 in series. However, the present invention is not limited thereto, and the bus bar 28 may connect the rechargeable batteries 30 in parallel.

A plurality of support protrusions 253 for contacting lateral sides (e.g., four lateral sides) of a corresponding bus bar 28 to support the bus bar 28 are formed in the support bar 25. The support protrusions 253 guide where to position the bus bar 28, and protect the bus bar 28 from an impact or vibration. The bus bar 28 has a quadrangular plate shape, and one bus bar 28 is formed to contact four support protrusions 253 at four respective sides of the bus bar 28.

FIG. 5 is a cross-sectional view of the battery module of FIG. 1 taken along the line V-V.

Referring to FIGS. 2 and 5, a support rib 131 protruding toward the first cover 12 is formed in the second cover 13, and the support rib 131 contacts an inner surface of the receiving unit 121. The support rib 131 is formed to extend in a circumferential direction of the second cover 13 (e.g., around a perimeter of the second cover 13 or a portion thereof), and has a quadrangular ring-shaped cross-section. A sealing member 14 is provided between the inner surface of the receiving unit 121 and the support rib 131 to form a seal therebetween. The sealing member 14 is extended in a quadrangular ring shape.

Accordingly, foreign materials may be prevented from entering between the first cover 12 and the second cover 13. On the other hand, a battery region 10a, into which the holder 20 is configured to be inserted, and a circuit region 10b, into which the protective circuit module 42 and the converter 41 are configured to be inserted, are formed in the housing 10.

A protection wall 132, by which the battery region 10a and the circuit region 10b are divided, is formed in or within the first cover 12. The protection wall 132 protrudes toward a top surface of the receiving unit 121, and is separated from the top surface of the receiving unit 121 of the first cover 12 while having an interval therebetween. As such, when the protection wall 132 is separated from the top surface of the first cover 12, the first cover 12 and the second cover 13 may press the holder 20 without being hindered by the protection wall 132.

However, in other embodiments, when the protection wall 132 is made of an elastic material, an upper end of the protection wall 132 may contact the top surface of the receiving unit 121 of the first cover 12. The protection wall 132 blocks the foreign materials from moving to the circuit region 10b from the battery region 10a, and reduces or prevents excessive pressure from being applied to the protective circuit module 42 by the housing 10.

A bottom surface of the holder 20 contacts the second cover 13, while a top surface of the holder 20 contacts the first cover 12. The first cover 12 and the second cover 13 are provided to press the holder 20 while facing each other in a direction toward which the rechargeable batteries 30 are stacked (e.g., an inward direction), and as a result, the rechargeable batteries 30 are pressed by the holder 20 and the housing 10, and are stably fixed.

As described above, according to the current exemplary embodiment, the rechargeable batteries 30 may be stably fixed without an end plate because they are fixed by the holder 20 and the housing 10.

On the other hand, the converter 41 and the protective circuit module 42 are provided in the circuit region 10b, and a voltage and a current may be controlled by the converter 41. The protective circuit module 42, which is a device for controlling charging and discharging operations of the rechargeable batteries 30, includes a substrate 421 and a plurality of circuit elements 423 mounted on the substrate 421.

The converter 41 is on the second cover 13, and the protective circuit module 42 is on the converter 41. A first support 125 protrudes from the first cover 12, and may protrude downward from the inner top surface of the receiving unit 121, and has a quadrangular cross-section. A first buffer plate 45 is provided under the first support 125, between the first support 125 and the protective circuit module 42, and prevents, or reduces the likelihood of, the circuit elements 423 being damaged by pressure of the first cover 12.

A second support 135 protrudes upward from the second cover 13, and has a quadrangular cross-section. A second buffer plate 43 having elasticity is on the second support 135, and the converter 41 is on the second buffer plate 43. The second buffer plate 43 prevents, or reduces the likelihood of, the converter 41 being damaged by the pressure of the second cover 13.

The first buffer plate 45 and the second buffer plate 43 may be made of a thermally conductive polymer (TCP) or a thermally conductive silicon. A blocking plate 46 is provided between the converter 41 and the protective circuit module 42 to prevent the converter 41 and the protective circuit module 42 from being short-circuited, and to prevent heat that is generated from the converter 41 from being transmitted to the protective circuit module 42. The blocking plate 46 is made of a heat-insulating material, and may be made of a heat-insulating polymer, which may be formed from a foaming resin.

Figure 6:
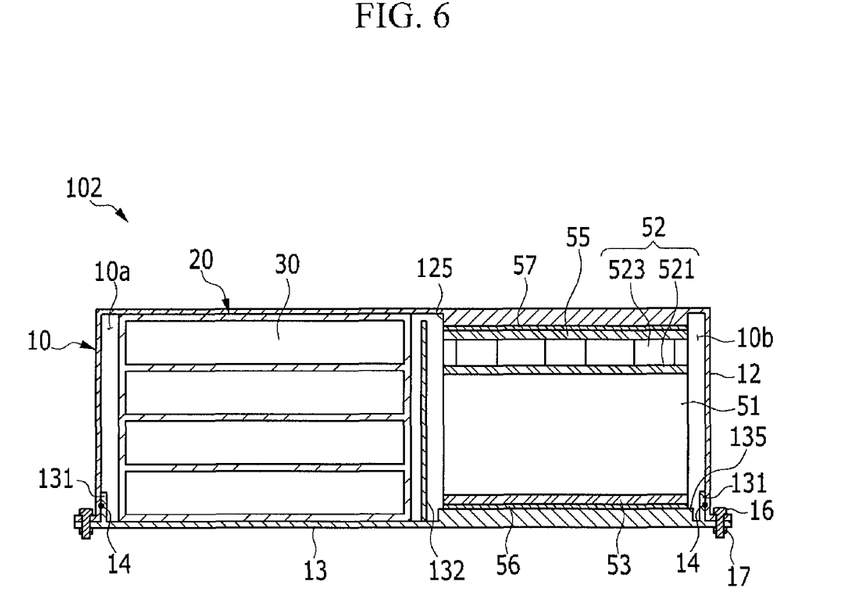
FIG. 6 is a longitudinal cross-sectional view of a battery module according to a second exemplary embodiment of the present invention.

FIG. 6 is a longitudinal cross-sectional view of a battery module according to a second exemplary embodiment of the present invention.

Referring to FIG. 6, the battery module 102 according to the current exemplary embodiment includes a plurality of rechargeable batteries 30, a holder 20, a housing 10, a protective circuit module 52, and a converter 51.

Because the battery module 102 according to the current exemplary embodiment has the same structure as the battery module 101 according to the first exemplary embodiment described above, with the exception of a structure of the protective circuit module 52 and the converter 51, a repeated description of the same elements will be omitted.

The rechargeable batteries 30 are accommodated in a battery region 10a of the housing 10 while being supported by the holder 20, and the protective circuit module 52 and the converter 51 are accommodated in a circuit region 10b of the housing 10.

The converter 51 is on a second cover 13, and the protective circuit module 52 is on the converter 51. The protective circuit module 52 is configured to control charging and discharging operations of the rechargeable batteries 30, and includes a substrate 521, and circuit elements 523 mounted on the substrate 521.

A first support 125 supporting the protective circuit module 52 protrudes from the first cover 12, and protrudes downward from the receiving unit 121, and has a quadrangular cross-section. A first thermally conductive plate 55 having excellent thermal conductivity is disposed under the first support 125, between the first support 125 and the protective circuit module 52. An upper thermal grease layer 57 is formed between the first thermally conductive plate 55 and the first support 125. The first thermally conductive plate 55 transmits heat generated from the protective circuit module 52 to the first cover 12.

The first thermally conductive plate 55 may be made of a metal such as aluminum, stainless steel, or the like. Alternatively, the first thermally conductive plate 55 may have a structure in which a surface of an elastic polymer is plated with a thin metal layer. In this case, the thin metal layer may be made of aluminum, gold, silver, etc.

A second support 135 supporting the converter 51 protrudes upward from the second cover 13, and has a quadrangular cross-section. A second thermally conductive plate 53 having excellent thermal conductivity is on the second support 135, and the converter 51 is on the second thermally conductive plate 53.

A lower thermal grease layer 56 is formed between the second thermally conductive plate 53 and the second support 135. The second thermally conductive plate 53 transmits heat generated from the converter 51 to the second cover 13.

The second thermally conductive plate 53 may be made of a metal such as aluminum, stainless steel, or the like. Alternatively, the second thermally conductive plate 53 may have a structure in which a surface of an elastic polymer is plated with a thin metal layer. In this case, the thin metal layer may be made of aluminum, gold, silver, etc.

When the first thermally conductive plate 55 and the second thermally conductive plate 53 are provided, the heat generated from the protective circuit module 52 and the converter 51 can be rapidly discharged.

While embodiments of the present invention have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Some of the Reference Characters | |
|---|---|
| 101, 102: battery module | 10: housing |
| 10a: battery region | 10b: circuit region |
| 12: first cover | 121: receiving unit |
| 123: flange portion | 125: first support |
| 13: second cover | 32: protection wall |
| 135: second support | 20: holder |
| 21: barrier | 23: storage space |
| 25: support bar | 251: terminal hole |
| 253: support protrusion | 28: bus bar |
| 30: rechargeable battery | 41, 51: converter |
| 42, 52: protective circuit module | 421, 521: substrate |
| 423, 523: circuit element(s) | 43: second buffer plate |
| 45: first buffer plate | 46: blocking plate |
| 53: second thermally conductive plate | 55: first thermally conductive plate |
| 56: lower thermal grease layer | 57: upper thermal grease layer |

What is claimed is:

1. A battery module comprising:
   a plurality of rechargeable batteries;
   a holder defining a plurality of storage spaces for holding the rechargeable batteries in a stacked configuration;
   a housing for enclosing the holder, and comprising a first cover and a second cover that face each other and press the holder;
   a protective circuit module in the housing and configured to control charging and discharging operations of the rechargeable batteries;
   a protection wall; and
   a converter,
   wherein the housing defines:
   a battery region into which the holder is inserted; and
   a circuit region into which the protective circuit module and the converter are inserted, and wherein the battery region and the circuit region are partitioned by the protection wall.

2. The battery module of claim 1, wherein an upper end of the protection wall is separated from a top surface of the second cover.

3. The battery module of claim 1, wherein the holder is cuboid shaped, and comprises a plurality of barriers for defining the storage spaces.

4. The battery module of claim 3, further comprising two support bars fixed at a side of the holder, and extending in a stacking direction of the rechargeable batteries, the support bars respectively defining terminal holes for respectively accommodating terminals of the rechargeable batteries.

5. The battery module of claim 4, further comprising a bus bar for electrically coupling the terminals,
wherein one of the support bars comprises support protrusions for contacting lateral sides of the bus bar to support the bus bar.

6. The battery module of claim 1, further comprising a first buffer plate having elasticity between the first cover and the protective circuit module.

7. The battery module of claim 6, further comprising a first support protruding from the first cover to contact the first buffer plate.

8. The battery module of claim 6, further comprising a second buffer plate having elasticity between the second cover and the converter.

9. The battery module of claim 8, further comprising a second support protruding from the second cover to contact the second buffer plate.

10. The battery module of claim 8, wherein the first buffer plate and the second buffer plate comprise a thermally conductive polymer or a thermally conductive silicon.

11. The battery module of claim 1, further comprising:
a first support protruding from the first cover; and
a first thermally conductive plate between the protective circuit module and the first support.

12. The battery module of claim 11, further comprising an upper thermal grease layer between the first thermally conductive plate and the first support.

13. The battery module of claim 11, further comprising:
a second support protruding from the second cover to support a bottom surface of the converter; and
a second thermally conductive plate between the converter and the second support.

14. The battery module of claim 13, further comprising a lower thermal grease layer between the second thermally conductive plate and the second support.

15. The battery module of claim 14, wherein the first thermally conductive plate and the second thermally conductive plate comprise an elastic polymer plated with a thin metal layer.

* * * * *